United States Patent
Porwal et al.

(10) Patent No.: US 12,443,621 B1
(45) Date of Patent: Oct. 14, 2025

(54) USING REINFORCEMENT LEARNING TO RECOMMEND DATA VISUALIZATIONS

(71) Applicant: ADOBE INC.

(72) Inventors: Vibhor Porwal, Bidhuna (IN); Subrata Mitra, Bangalore (IN); Shubham Agarwal, West Bengal (IN); Ryan A Rossi, Santa Clara, CA (US); Ghazi Shazan Ahmad, West Bengal (IN); Manav Ketan Doshi, Maharashtra (IN); Syam Manoj Kumar Paila, Andhra Pradesh (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 18/668,888

(22) Filed: May 20, 2024

(51) Int. Cl.
  *G06F 16/26* (2019.01)
(52) U.S. Cl.
  CPC .................. *G06F 16/26* (2019.01)
(58) Field of Classification Search
  CPC ....................................................... G06F 16/26
  USPC ....................................................... 707/603
  See application file for complete search history.

(56) References Cited

U.S. PATENT DOCUMENTS

| | | | |
|---|---|---|---|
| 7,685,377 B1 | 3/2010 | Milligan | |
| 8,621,422 B1 | 12/2013 | Hsu et al. | |
| 9,866,392 B1 | 1/2018 | Campagna et al. | |
| 10,013,497 B1 | 7/2018 | Boodman | |
| 10,620,790 B2 | 4/2020 | Ellis et al. | |
| 10,664,362 B2 | 5/2020 | Larson et al. | |
| 10,970,053 B2 | 4/2021 | Kandogan et al. | |
| 11,182,748 B1 | 11/2021 | Neckermann et al. | |
| 11,256,710 B2 | 2/2022 | Gulwani et al. | |
| 11,500,882 B2 | 11/2022 | Anand et al. | |
| 11,714,807 B2 | 8/2023 | Amulu et al. | |

(Continued)

FOREIGN PATENT DOCUMENTS

| | | |
|---|---|---|
| AU | 2012372150 A1 | 11/2013 |
| CA | 2731979 A1 | 3/2010 |

(Continued)

OTHER PUBLICATIONS

"Ai2html", archietse, Retrieved from Internet URL: http://ai2html.org/, accessed on May 16, 2022, pp. 1-13 (2011).

(Continued)

*Primary Examiner* — Baoquoc N To
(74) *Attorney, Agent, or Firm* — Shook, Hardy & Bacon L.L.P.

(57) ABSTRACT

Methods and systems are provided for using reinforcement learning to recommend data visualizations. In embodiments described herein, statistical features for each sample of corresponding samples of a dataset are determined by applying each sample of the dataset to a data visualization recommendation model. The computational cost of each of the statistical features for each of the samples is determined based via a regression model. Recommended statistical features are determined by sequentially applying each sample to a reinforcement learning model with a computational budget and with the corresponding computational costs of the statistical features of each sample. A data visualization is then displayed that is generated by applying the dataset and the recommended statistical features to the data visualization recommendation model.

20 Claims, 6 Drawing Sheets

(56) References Cited

U.S. PATENT DOCUMENTS

| | | | |
|---|---|---|---|
| 11,720,550 | B2 | 8/2023 | Budovski et al. |
| 11,782,576 | B2 | 10/2023 | Harris et al. |
| 11,816,436 | B2 | 11/2023 | Panuganty et al. |
| 2002/0052910 | A1 | 5/2002 | Bennett et al. |
| 2003/0033554 | A1 | 2/2003 | Bomfim et al. |
| 2003/0133505 | A1* | 7/2003 | Koyanagi ............... H03M 7/30 375/240.21 |
| 2008/0154905 | A1 | 6/2008 | Paalasmaa et al. |
| 2008/0320225 | A1 | 12/2008 | Panzer et al. |
| 2009/0322755 | A1 | 12/2009 | Holm-Peterson et al. |
| 2010/0070535 | A1 | 3/2010 | Irun-Briz et al. |
| 2012/0272240 | A1 | 10/2012 | Starks et al. |
| 2013/0263019 | A1 | 10/2013 | Castellanos et al. |
| 2013/0329557 | A1 | 12/2013 | Petry et al. |
| 2013/0332862 | A1 | 12/2013 | Mirra et al. |
| 2014/0282184 | A1 | 9/2014 | Dewan et al. |
| 2014/0306964 | A1 | 10/2014 | Reddish et al. |
| 2014/0310619 | A1 | 10/2014 | Fickenwirth et al. |
| 2015/0039537 | A1 | 2/2015 | Peev et al. |
| 2016/0110167 | A1 | 4/2016 | Broadbent et al. |
| 2016/0232151 | A1 | 8/2016 | Blackmon |
| 2017/0090910 | A1 | 3/2017 | Deluca et al. |
| 2018/0113873 | A1 | 4/2018 | Gulwani et al. |
| 2018/0129372 | A1 | 5/2018 | Ellis et al. |
| 2018/0189294 | A1 | 7/2018 | Anand et al. |
| 2018/0189691 | A1 | 7/2018 | Oehrle et al. |
| 2019/0042212 | A1 | 2/2019 | Kandogan et al. |
| 2019/0102703 | A1 | 4/2019 | Belyaev et al. |
| 2019/0138912 | A1 | 5/2019 | Modarresi et al. |
| 2019/0361720 | A1 | 11/2019 | Balachandran |
| 2020/0034481 | A1 | 1/2020 | Asplund et al. |
| 2020/0058012 | A1* | 2/2020 | Chandorkar ......... G06Q 20/227 |
| 2020/0065772 | A1 | 2/2020 | Whitehead et al. |
| 2020/0134074 | A1 | 4/2020 | Mankovskii et al. |
| 2020/0151217 | A1 | 5/2020 | Kothe et al. |
| 2020/0293933 | A1 | 9/2020 | Ghosh et al. |
| 2020/0334607 | A1 | 10/2020 | Fadel et al. |
| 2020/0349589 | A1 | 11/2020 | Southall et al. |
| 2020/0387810 | A1 | 12/2020 | Hodgson et al. |
| 2021/0097062 | A1 | 4/2021 | Mishra et al. |
| 2021/0240702 | A1 | 8/2021 | Mei et al. |
| 2021/0272029 | A1 | 9/2021 | Karlberg et al. |
| 2021/0350068 | A1 | 11/2021 | Sanossian |
| 2021/0374770 | A1 | 12/2021 | Banerjee et al. |
| 2022/0300836 | A1 | 9/2022 | Rossi et al. |
| 2022/0358405 | A1 | 11/2022 | Every et al. |
| 2022/0405314 | A1 | 12/2022 | Du et al. |
| 2023/0048938 | A1 | 2/2023 | Vertsel et al. |
| 2023/0063424 | A1 | 3/2023 | Zeghlache |
| 2023/0079109 | A1 | 3/2023 | Anand et al. |
| 2023/0169671 | A1* | 6/2023 | Jung ....................... G06V 10/82 382/154 |
| 2023/0385141 | A1* | 11/2023 | Xu ....................... G06F 11/3457 |
| 2024/0333615 | A1* | 10/2024 | Ford ....................... H04L 43/045 |
| 2025/0061506 | A1* | 2/2025 | Sankararaman ... G06Q 30/0631 |

FOREIGN PATENT DOCUMENTS

| | | |
|---|---|---|
| CN | 113011400 A | 6/2021 |
| CN | 115438210 A | 12/2022 |
| WO | 03/62993 A2 | 7/2003 |
| WO | 2013/170289 A1 | 11/2013 |
| WO | 2021/231040 A1 | 11/2021 |

OTHER PUBLICATIONS

"Cascade and Inheritance", MON, Retrieved from Internet URL : https://developer.mozilla.org/en-US/docs/Learn/CSS/Building_blocks/ Cascade_and_inheritance, accessed on Jul. 4, 2022, pp. 1-26.

"DataWrapper", Retrieved from Internet URL: https://www. datawrapper.de/, accessed on May 12, 2022, pp. 9.

"Documentation-Vega", Retrieved from Internet URL: https://vega. github.io/vega/docs/, accessed on May 13, 2022, pp. 2.

"Power BI", Microsoft, Retrieved from Internet URL: https:// powerplalform.microsofl.com/en-us/, accessed on Jul. 5, 2022, pp. 9.

"Tableau Software", Retrieved from Internet URL: https://www. tableau.com/, accessed on Jul. 5, 2022, pp. 13 2003).

"Using Google Charts", Google Developers, Retrieved from Internet URL: https://developers-dot-devsite-v2-prod.ppspol.com/chart/ interactive/docs, accessed on May 13, 2022, pp. 2 (2019).

"Using Media Queries", MON, Retrieved from Internet URL : https://developer.mozilla.org/en-US/docs/Web/CSS/Media_Queries/ Using_media_queries, accessed on Jul. 4, 2022, pp. 1-8.

"ZingSofl", ZingChart, Retrieved from Internet URL :https://www. zingchart.com/, accessed on Jun. 29, 2022, p. 1.

"CRM Analytics", Salesforce Analytics Software and Tools I Tableau CRM-Salesforce.com, Retrieved from Internet URL : https:// www.salesforce.com/products/crm-analytics/overview/, accessed on Dec. 7, 2022, pp. 14.

"Lexio—Data stories speak louder than dashboards", Lexio | The Future of Data + Analytics, Narrative Science, A Salesforce Company, Retrieved from Internet URL : Wayback Machine—https:// web.archive.org/web/20220520130304/https://narrativescience.com/ lexio, accessed on Dec. 7, 2022, pp. 11 (2021).

"Natural Language Technology for Every Use Case—Arria NLG", Arria NLG Technology Suite, Retrieved from Internet URL : https://www.arria.com/technology-suite/, accessed on Dec. 7, 2022, pp. 1.

"Visa Chart Components", Visa Developer Center, Retrieved from Internet URL : https://developer.visa.com/pages/chart-components, accessed on Dec. 7, 2022, pp. 9.

"Wordsmith I Automated Insights", Retrieved from Internet URL : https://automatedinsights.com/wordsmith/, accessed on Dec. 7, 2022, pp. 4.

A Declarative Language for Integrating Machine Learning in Visual Analytics by Jianping et. al (https://arxiv.org/pdf/2009.01399.pdf) (Year: 2020).

Ahmad et al., "ScaleViz: Scaling Visualization Recommendation Models on Large Data", In Pacific-Asia Conference on Knowledge Discovery and Data Mining, Apr. 25, 2024.

Andrews, K., "Responsive Visualisation", In MobileVis '18 Workshop at CHI, ACM, pp. 1-6 {Apr. 2018).

Bentley, E., "The Web as Medium for Data Visualization", In The Data Journalism Handbook: Towards a Critical Data Practice, pp. 182-192 (2021).

Bostock, M., "d3-format", Retrieved from Internet URL: hllps:// web.archive.org/web/20220421224649/hllps://github.com/d3/d3-formal/, accessed on May 12, 2022, pp. 1-11.

Bostock, M., et al., "D3 Data-Driven Documents", IEEE Transactions on Visualization and Computer Graphics, vol. 17, No. 12, pp. 2301-2309 (Dec. 2011).

Brewka, G., et al., "Answer Set Programming at a Glance", Retrieved from Internet URL : https://doi.org/10.1145/2043174.2043195, ACM, vol. 54, No. 12, pp. 93-103 (Dec. 2011).

Bryant, J., and Jones, M., "Responsive Web Design", Chapter 4, pp. 37-49 (2012).

Cui, Z., et al., "DataSite: Proactive visual data exploration with computation of insight-based recommendations", Information Visualization, Retrieved from Internet URL: https://doi.org/10.1177/ 1473871618806555, vol. 18, No. 2, pp. (251-267 (2019).

Ding et al., "QuickInsights: Quick and Automatic Discovery of Insights from Multi-Dimensional Data", SIGMOD'19, Jun. 30-Jul. 5, 2019, 15 pages.

Gal, R., "Responsive visualizations coming to Power BI", Retrived from Internet URL: https://powerbi.microsofl.com/in-us/blog/ responsive-visualizations-coming-to-power-bi/, accessed on May 13, 2022, pp. 1-11.

Gebser, M., et al., "Clingo = ASP + Control: Preliminary Report", Retrieved from Internet URL : https://doi.org/10.48550/arXiv.1405. 3694, pp. 1-9 (May 2014).

Gebser, M., et al., "Potassco: The Potsdam Answer Set Solving Collection", AI Communications, IOS Press, https://doi.org/10.3233/ AIC-2011-0491, pp. 107-124 (2011).

(56) References Cited

OTHER PUBLICATIONS

Giacomo, E., D., et al., "Network Visualization Retargeting", 6th International Conference on Information, Intelligence, Systems and Applications (IISA), IEEE, pp. 1-6 (2015).
Hoffswell, J., et al., "SetCoLa: High-Level Constraints for Graph Layout", Eurographics Conference on Visualization (EuroVis), vol. 37, No. 3, pp. 1-12 (2018).
Hoffswell, J., et al., "Techniques for Flexible Responsive Visualization Design", CHI, ACM, pp. 1-13 (2020).
International Search Report and Written Opinion received for PCT Patent Application No. PCT/US2022/027539, mailed on Jul. 28, 2022, 12 pages.
Jakobsen, M., R., and Hornbjek, K., "Interactive Visualizations on Large and Small Displays: The Interrelation of Display Size, Information Space, and Scale", IEEE Transactions on Visualization and Computer Graphics, vol. 19, No. 12, pp. 2336-2345 (Dec. 2013).
Kachuee et al., "Opportunistic Learning: Budgeted Cost-Sensitive Learning From Data Streams", Published as a conference paper at ICLR 2019, Available at : <arXiv:1901.00243v2 [cs.LG] Feb. 18, 2019>, Feb. 18, 2019, pp. 1-12.
Kim, D. H, et al., "Towards Understanding How Readers Integrate Charts and Captions: A Case Study with Line Charts", In Proceedings of the CHI Conference on Human Factors in Computing Systems, pp. 1-11 (May 8-13, 2021).
Kim, H., et al., "An Automated Approach to Reasoning About Task-Oriented Insights in Responsive Visualization", IEEE Transactions on Visualization and Computer Graphics, pp. 1-11 {Jul. 2021).
Kim, H., et al., "Design Patterns and Trade-Offs in Responsive Visualization for Communication", Eurographics Conference on Visualization, vol. 40, No. 3, pp. 1-12 {Apr. 2021).
Kim, Y., and Heer, J., "Gemini: A Grammar and Recommender System for Animated Transitions in Statistical Graphics", IEEE, arXiv:2009.01429v1, pp. 1-10 {Sep. 2020).
Kim, Y., et al., "GraphScape: A Model for Automated Reasoning about Visualization Similarity and Sequencing", CHI, ACM, pp. 2628-2638 {May 2017).
Law, P-M., et al., "Characterizing Automated Data Insights", In IEEE Visualization Conference (VIS), arXiv:2008.13060v2, pp. 1-5 (Sep. 4, 2020).
Leclaire, J., and Tabard, A., "R3S.js—Towards Responsive Visualizations", In Workshop on Data Exploration for nteractive Surfaces DEXIS, ACM ITS, pp. 16-19 (2015).
Li et al., "Feature Selection: A Data Perspective", ACM Comput. Surv. vol. 50, No. 6, Article 94, Dec. 2017, 45 pages.
Lin, H., et al., "Dziban: Balancing Agency & Automation in Visualization Design via Anchored Recommendations", CHI, ACM, pp. 1-12 (2020).
Ma, R., et al., "LADV: Deep Learning Assisted Authoring of Dashboard Visualizations from Images and Sketches", IEEE Transactions on Visualization and Computer Graphics, pp. 1-15 (2020).
MacKinlay, J., D., et al., "Show Me: Automatic Presentation for Visual Analysis", IEEE Transactions on Visualization nd Computer Graphics, pp. 1-8 (2007).
Mendez, G., G., et al., "Bottom-up vs. Top-down: Trade—Offs in Efficiency, Understanding, Freedom and Creativity with InfoVis Tools", CHI, ACM, pp. 1-12 (2017).
Mohorovicic, S., "Implementing Responsive Web Design for Enhanced Web Presence", 36th International Convention on Information and Communication Technology, Electronics and Microelectronics {MIPRO), pp. 1206-1210 2013).
Moritz, D., "Formalizing Visualization Design Knowledge as Constraints: Actionable and Extensible Models in Draco", IEEE Trans. Visualization & Comp. Graphics, pp. 1-11 (2018).
Muth, L., C., "Create better, more responsive text annotations {yes, also on maps)", Retrieved from Internet URL: https://blog.datawrapper.de/beller-more-responsive-annotationsin-datawrapper-data-visualizations/, accessed on May 14, 2022, pp. 1-10.
Muth, L., C., and Aisch, G., "Our new Tables: responsive, with sparklines, bar charts and sticky rows", Retrieved ram Internet URL : https://blog.datawrapper.de/new-tabletool-barcharts-fixed-rows-responsive-2/, accessed on May 14, 2022, pp. 1-14.
Notice of Allowance received for U.S. Appl. No. 18/484,674, mailed on Aug. 23, 2024, 14 pages.
Qian et al., "Learning to Recommend Visualizations from Data", KDD '21, Aug. 14-18, 2021, 11 pages.
Sam, C., "Ai2html and Its Impact on the News Graphics Industry", In MobileVis '18 Workshop at CHI, pp. 1-6 (2018).
Satyanarayan, A., and Heer, J., "Lyra: An Interactive Visualization Design Environment", Eurographics Conference on Visualization, vol. 33, No. 3, pp. 1-10 (2014).
Satyanarayan, A., et al., "Reactive Vega: A Streaming Dataflow Architecture for Declarative Interactive Visualization", In IEEE Trans. Visualization & Comp. Graphics, pp. 1-10 (2015).
Satyanarayan, A., et al., "Vega-Lite: A Grammar of Interactive Graphics", IEEE Trans. Visualization & Comp. Graphics, pp. 1-10 (2016).
Shi, D., et al., "Calliope: Automatic visual data story generation from a spreadsheet", IEEE Transactions on Visualization and Computer Graphics, arXiv:2010.09975v1, vol. 27, No. 2, pp. 1-11 (Oct. 20, 2020).
Srinivasan, A., et al., "Augmenting Visualizations with Interactive Data Facts to Facilitate Interpretation and Communication", IEEE Transactions on Visualization and Computer Graphics, vol. 25, No. 1, pp. 672-681 {January, ] 019).
Wickham, H., et al., "A Layered Grammar of Graphics", Journal of Computational and Graphical Statistics, vol. 19, No. 1, pp. 3-28 (2010).
Wongsuphasawat, K., et al., "Voyager 2: Augmenting Visual Analysis with Partial View Specifications", Proceedings of the 2017 CHI Conference on Human Factors in Computing Systems, ACM, pp. 2648-2659 (2017).
Wongsuphasawat, K., et al., "Voyager: Exploratory Analysis via Faceted Browsing of Visualization Recommendations", IEEE Transactions on Visualization and Computer Graphics, pp. 1-10 (2015).
Wu, A., et al., "Learning to Automate Chart Layout Configurations Using Crowdsourced Paired Comparison", Association for Computing Machinery, ACM, ISBN, pp. 1-12 (2021).
Wu, A., et al., "MobileVisFixer: Tailoring Web Visualizations for Mobile Phones Leveraging an Explainable Reinforcement Learning Framework", IEEE Transactions on Visualization and Computer Graphics, pp. 1-11 {Aug. 2020).
Wu, Y., et al., "ViSizer: A Visualization Resizing Framework", IEEE Transactions on Visualization and Computer Graphics, pp. 1-14 (2012).
Xiong, C., et al., Visual Arrangements of Bar Charts Influence Comparisons in Viewer Takeaways, IEEE Trans. Visualization & Comp. Graphics, pp. 1-11 {Aug. 2021).
Unpublished U.S. Appl. No. 18/409,240, Title : Training and Utilizing Language Machine Learning Models to Create Structured Outputs for Building Digital Visualizations From Analytics.

* cited by examiner

USING REINFORCEMENT LEARNING TO RECOMMEND DATA VISUALIZATIONS

BACKGROUND

Data visualizations provide a powerful way to convey information. In particular, visualizing data in a meaningful or compelling way can be influential and facilitate decisions making. Many existing data analytics and visualization tools are sophisticated. Creating a meaningful, or compelling, data visualization using such visualization tools, however, can be difficult and tedious. For example, many data consumers have limited experience with data science and/or graphical designs making generation of data visualizations difficult. Further, an extensive amount of data and data visualizations can make it time consuming to identify specific data and an appropriate manner in which to present the data.

SUMMARY

Various aspects of the technology described herein are generally directed to systems, methods, and computer storage media for, among other things, using reinforcement learning (RL) to recommend data visualizations. In this regard, embodiments described herein facilitate determining the optimal features of a dataset for recommended data visualizations of a data visualization recommendation model by applying a computational budget and samples of the dataset to an RL framework. For example, a dataset, a computational budget, and a data visualization recommendation model are accessed by an RL framework. The RL framework is trained to determine a set of recommended features of the dataset based on a computational budget by sequentially exploring a series of samples of the dataset. In order to determine the set of recommended features of the dataset, a sample of the dataset is determined, such as by randomly sampling the dataset. The sample of the dataset is applied to a data visualization recommendation model to determine features of the sample. The features of the sample are applied to a regression model to determine a computational cost estimation for determining each of the features of the sample when the features of the sample are applied to the entire dataset. The computational budget and the sample of the dataset are applied to an RL agent of the RL framework and the RL agent determines a subset of the features of the sample that can be computed within the computational budget based on the corresponding computational cost of each of the subset of features. A loss function is computed based on a difference between a combined score for each of the features of the sample determined by the data visualization recommendation model and a combined score of each of the subset of features of the sample determined by the RL agent. A series of samples of the dataset are sequentially explored in a similar manner in order to minimize the loss function resulting in the RL framework determining a recommended set of features. The data visualization recommendation model determines the recommended data visualizations based on the recommended set of features. The data visualization recommendation model generates the recommended data visualizations by populating the recommended data visualization with corresponding data from the dataset. The recommended data visualizations are then displayed to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
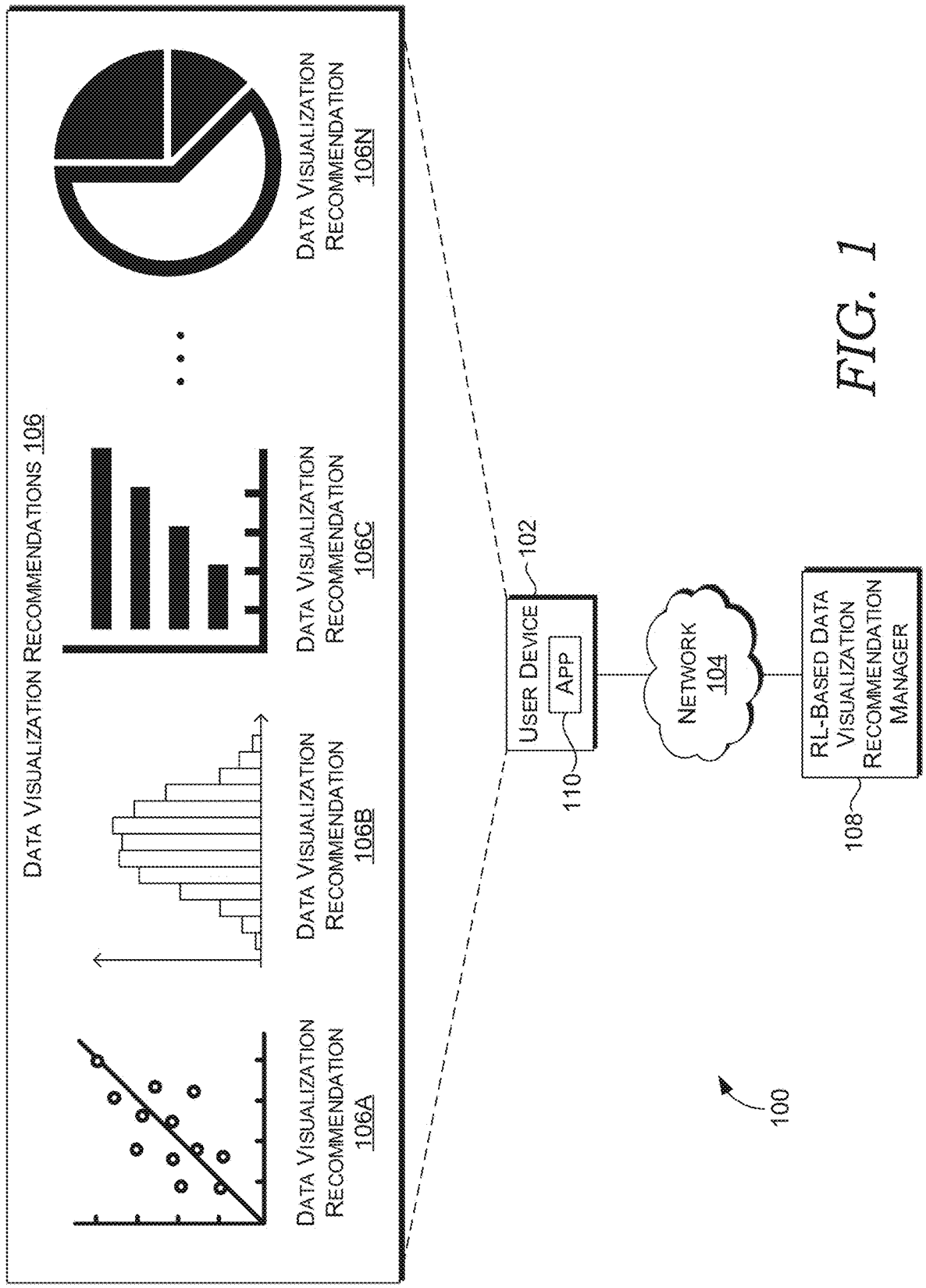
FIG. 1 depicts a diagram of an environment in which one or more embodiments of the present disclosure can be practiced, in accordance with various embodiments of the present disclosure.

Data visualization recommendation models help to automatically generate, score, and recommend the most relevant visualizations for an input dataset to improve the identification and generation of data visualizations. In this regard, data visualization recommendation models reduce the time required by users, such as data analysts, to determine features (e.g., statistical features based on statistical functions applied to the input dataset, descriptive features, such as the name or type of variable, and/or any feature of the dataset) of an input dataset and recommend data visualizations based on the features. Any known data visualization recommendation model (e.g., such as any known data visualization recommendation technique) can be used to determine features, such as statistical features, and recommend data visualizations for a dataset, in accordance with embodiments of the present disclosure.

Currently, data visualization recommendation models operate by initially applying a significant number of statistical functions to the dataset to determine all of the statistical features of the dataset (e.g., statistical features of each variable/attribute, such as columns and/or rows). For example, in one data visualization recommendation model, a significant number (e.g., 1006) of statistical functions (e.g., percent of unique values, mean, median, minimum, maximum, skew, standard deviation, skew, kurtosis features, quartile dispersion coefficient, median absolute deviation, coefficient of variation, efficiency ratio, variance-to-mean ratio, entropy, normalized entropy, Gini coefficient, signal-to-noise ratio, and/or any other statistical function) are applied to each column (and/or row) and/or combinations of columns (and/or rows) (e.g., dependency, correlation, and/or other statistical functions between combinations of columns and/or rows) of the dataset in order to determine the statistical features of the dataset based on the statistical functions.

After determining all of the features, including all of the statistical features, of the dataset, all of the features are used to score data visualization configurations (e.g., combinations of columns, aggregates, plot types, etc.) of the recommended data visualizations in a supervised learning setup. In this regard, the supervised learning setup can score the data visualization configurations based on ground truth, such as based on personal preferences, prior data visualizations generated by the user, ground truth data visualizations, annotations regarding the data visualizations, and/or others, to determine the data visualization configurations of the recommended data visualizations. For example, data visualization configurations may include characteristics, such as a visualization type (e.g., scatterplot, bar chart, Venn diagram, and/or others), binning ranges for data values, an orientation (e.g., horizontal axes, vertical axes), colors applied to data points, and/or other characteristics of the visualization configuration. Finally, after the recommended data visualizations are determined, queries are issued against the dataset to generate the recommended data visualizations (e.g., by populating the recommended data visualization with corresponding data from the dataset).

However, as the size of the dataset increases, the computational cost required by existing data visualization recommendation models increases exponentially. Existing data visualization recommendations models require all of the features of the dataset in order to determine the recommended data visualizations. Therefore, as the size of the dataset increases, the computational cost required by existing data visualization recommendation models to apply the significant number of statistical functions to the dataset in order to determine all of the features of the dataset increases exponentially. In this regard, it becomes infeasible due to the prohibitively large computational time to apply existing data visualization recommendation models to large datasets (e.g., as is the case in many real-world datasets that can have hundreds of billions of rows/columns).

Accordingly, unnecessary computing resources are utilized to apply the significant number of statistical functions to the dataset to determine all of the features of the dataset in order to determine the recommended data visualizations in conventional implementations. For example, computing and network resources are unnecessarily consumed (e.g., due to the increase in computer input/output operations) to facilitate determining all of the features of a dataset in order to determine the recommended data visualizations. Further, when the dataset is located in a disk array, there is unnecessary wear placed on the read/write head of the disk of the disk array to apply the significant number of statistical functions to the dataset and determine all of the features of the dataset. Even further, the processing of operations to determine all of the features of a dataset in order to determine the recommended data visualizations increases the network latency and increases packet generation costs when the dataset is located over a network.

As such, embodiments of the present disclosure are directed to using RL to recommend data visualizations in an efficient and effective manner. In this regard, the use of RL to recommend data visualizations can be efficiently and effectively utilized to determine the optimal features of a dataset for recommended data visualizations of a data visualization recommendation model for a given computational budget. In this way, by using only the optimal features, rather than all of the features of a data visualization recommendation model, the computational cost of determining the recommended data visualizations is significantly decreased enabling the use of the data visualization recommendation model for larger datasets (e.g., real-world datasets that can have hundreds of billions of rows/columns).

Generally, and at a high level, embodiments described herein facilitate using RL to recommend data visualizations. In particular, embodiments described herein facilitate determining the optimal features of a dataset for recommended data visualizations of a data visualization recommendation model by applying a computational budget and samples of the dataset to an RL framework. For example, a dataset, a computational budget, and a data visualization recommendation model are accessed by an RL framework. The RL framework is trained to determine a set of recommended features of the dataset based on a computational budget by sequentially exploring a series of samples of the dataset. In order to determine the set of recommended features of the dataset, a sample of the dataset is determined, such as by randomly sampling the dataset. The sample of the dataset is applied to a data visualization recommendation model to determine features of the sample. The features of the sample are applied to a regression model to determine a computational cost estimation for determining each of the features of the sample when the features of the sample are applied to the entire dataset. The computational budget and the sample of the dataset are applied to an RL agent of the RL framework and the RL agent determines a subset of the features of the sample that can be computed within the computational budget based on the corresponding computational cost of each of the subset of features. A loss function is computed based on a difference between a combined score for each of the features of the sample determined by the data visualization recommendation model and a combined score of each of the subset of features of the sample determined by the RL agent. A series of samples of the dataset are sequentially explored in a similar manner in order to minimize the loss function resulting in the RL framework determining a recommended set of features. The data visualization recommendation model determines the recommended data visualizations based on the recommended set of features. The data visualization recommendation model generates the recommended data visualizations by populating the recommended data visualization with corresponding data from the dataset. The recommended data visualizations are then displayed to the user.

In operation, a dataset, a computational budget, and a data visualization recommendation model are accessed by an RL framework. For example, a user inputs a dataset in order to generate recommendation data visualizations for the dataset. The user inputs a computational budget, such as an amount of time for processing the generating of the recommended data visualizations. The user inputs a data visualization recommendation model, such as by inputting a request to generate data visualization recommendations and/or selecting a data visualization recommendation model from a plurality of different data visualization recommendation models. Any known data visualization recommendation model (e.g., such as any known data visualization recommendation technique) can be accessed by the RL framework. A "computational budget" generally refers to the a predefined allocation of computational resources, such as processing time, memory, power, and/or other computational resources, designated for th the execution of a specific task or process within a computing system.

The RL framework is trained to determine a set of recommended features of the dataset based on a computational budget by sequentially exploring a series of samples of the dataset. In order to determine the set of recommended features of the dataset, a sample of the dataset (e.g., a small sample size, such as 1%) is determined, such as by randomly sampling the dataset. In some embodiments, the size of the sample is determined based on the size of the dataset. For example, for a dataset with a billion rows, the size of the sample may be 0.001% whereas for a dataset with a million rows, the sample size may be 0.1%.

The sample of the dataset is applied to a data visualization recommendation model to determine features of the sample (e.g., by applying the statistical functions of the data visualization recommendation model to the sample, accessing metadata to determine descriptive features of the sample, etc.) and a score for each of the features of the sample. For example, the scores for each of the features of the sample corresponds to the scores of the data visualization configurations determined based on each of the features that are used to determine the recommended data visualizations by the data visualization recommendation model. As can be understood, the computational cost to compute features for a sample of the dataset is exponentially less than computing features of the entire dataset (e.g., based on the sample size with respect to the size of the dataset).

The features (e.g., the statistical features) of the sample are applied to a regression model to determine a computational cost estimation for determining each of the features (e.g., the statistical features) of the sample when the features of the sample are applied to the dataset (e.g., when the corresponding statistical function of a statistical feature of the sample is applied to the entire dataset instead of just the sample). In this regard, a regression model is trained to determine the computational cost estimation (e.g., the time to compute a feature) for a feature (e.g., a statistical feature) based on the size of the dataset and the computational capabilities of the system implementing the RL framework. For example, the regression model profiles the computational cost estimation (e.g., time) of each feature across varying dataset sizes by utilizing data points to estimate the computational cost estimation for each feature for larger datasets (e.g., extrapolate to larger datasets) without requiring the actual computation of the feature.

The computational budget and the sample of the dataset are applied to an RL agent of the RL framework and the RL agent determines a subset of the features of the sample that can be computed within the computational budget based on the corresponding computational cost of each of the subset of features. For example, the RL agent starts with zero cost features (e.g., features, such as descriptive features, length of the data, title, which columns are numeric, etc., that take minimal computational cost to compute, such as below a threshold amount of time) and keeps exploring features to add to the subset of feature until the computational budget is met. At each exploration step of the RL agent, the RL agent determines whether to explore (e.g., randomly) a new feature to add to the subset of features or exploit knowledge of a previously selected feature (e.g., the current knowledge of the RL agent based on the sequential series of samples) based on a reward function. The reward function is based on a change (e.g., an absolute value of the change) in the combined score of the subset of features (e.g., as determined by the data visualization recommendation model) before and after adding the new feature to the subset of features with respect to the computational cost of the new feature (e.g., as determined by the regression model).

A loss function is computed based on a difference between a combined score for each of the features of the sample determined by the data visualization recommendation model and a combined score of each of the subset of features of the sample determined by the RL agent. A series of samples of the dataset are sequentially explored in a similar manner in order to minimize the loss function resulting in the RL framework determining a recommended set of features. For example, a subsequent sample is applied to the data visualization recommendation model to determine features of the subsequent sample and a score for each of the features of the subsequent sample. In some embodiments, the size of each subsequent sample of the series of samples is greater than the previous sample. For example, an initial sample of the dataset is a 0.1% random sampling of the dataset and a subsequent sample is a 0.5% random sampling of the dataset. The features of the subsequent sample and the dataset are applied to the regression model to determine a computational cost estimation for determining each of the features of the subsequent sample when the features of the sample are applied to the dataset. The computational budget and the subsequent sample of the dataset are applied to the RL agent of the RL framework and the RL agent determines a subset of the features of the subsequent sample that can be computed within the computational budget based on the corresponding computational cost of each of the subset of features of the subsequent sample. The loss function is computed based on a difference between a combined score for each of the features of the sample determined by the data visualization recommendation model and a combined score of each of the subset of features of the subsequent sample determined by the RL agent.

The process of sequentially exploring a series of samples is terminated when the loss function is below a threshold value resulting in the RL framework determining a recommended set of features. In this regard, the RL agent of the RL framework is trained to determine a recommended set of features for the dataset by sequentially exploring a series of samples of the dataset. The data visualization recommendation model determines the recommended data visualizations based on the recommended set of features (e.g., as determined by the RL framework). The data visualization recommendation model generates the recommended data visualizations by populating the recommended data visualization with corresponding data from the dataset. The recommended data visualizations are then displayed to the user.

Advantageously, efficiencies of computing and network resources can be enhanced using implementations described herein. In particular, the automated process for using RL to recommend data visualizations to identify the optimal features of a dataset that can be computed within a computational budget based on samples of the original dataset provides for a more efficient use of computing and network resources (e.g., less operations, higher throughput and reduced latency for a network, less packet generation costs, etc.) than prior methods. For example, using implementations described herein enhances efficiencies of computing and network resources with respect to prior methods of applying the significant number of statistical functions to the dataset to determine all of the features of the dataset in order to determine the recommended data visualizations.

Having provided an overview of the technology described herein, reference is now made to FIG. 1. FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 6.

It should be understood that operating environment 100 shown in FIG. 1 is an example of one suitable operating environment. Among other components not shown, operating environment 100 includes a user device 102, application 110, network 104, and RL-based visualization recommendation manager 108. Operating environment 100 also shows an example 106 showing the example data visualization recommendations 106A-N. For example, example data visualization recommendation 106A shows an example scatterplot, example data visualization recommendation 106B shows an example vertically-oriented bar chart, example data visualization recommendation 106C shows an example horizontally-oriented bar chart, and example data visualization recommendation 106N shows an example pie chart. Each of the components shown in FIG. 1 can be implemented via any type of computing device, such as one or more of computing device 600 described in connection to FIG. 6, for example.

These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, one or more private networks, one or more cellular networks, one or more peer-to-peer (P2P) networks, one or more mobile networks, or a combination of networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User device 102 can be any type of computing device capable of being operated by an individual(s) (e.g., a data analyst, any user that analyzes data, etc.). For example, in some implementations, such devices are the type of computing device described in relation to FIG. 6. By way of example and not limitation, user devices can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media may include computer-readable instructions executable by the one or more processors. The instructions may be embodied by one or more applications, such as application 110 shown in FIG. 1. Application 110 is referred to as single applications for simplicity, but its functionality can be embodied by one or more applications in practice.

Application 110 operating on user device 102 can generally be data analysis application that allows a user access datasets and view data visualizations. In some implementations, the application 110 comprises a web application, which can run in a web browser, and could be hosted at least partially server-side (e.g., via an RL-based visualization recommendation manager 108). In addition, or instead, the application 110 can comprise a dedicated application. In some cases, the application 110 is integrated into the operating system (e.g., as a service).

User device 102 can be a client device on a client-side of operating environment 100, while RL-based visualization recommendation manager 108 can be on a server-side of operating environment 100. RL-based visualization recommendation manager 108 may comprise server-side software designed to work in conjunction with client-side software on user device 102 so as to implement any combination of the features and functionalities discussed in the present disclosure. An example of such client-side software is application 110 on user device 102. This division of operating environment 100 is provided to illustrate one example of a suitable environment, and it is noted there is no requirement for each implementation that any combination of user device 102 or RL-based visualization recommendation manager 108 to remain as separate entities.

Application 110 operating on user device 102 can generally be any application capable of facilitating the exchange of information between the user device 102 and the RL-based visualization recommendation manager 108 in displaying and exchanging information regarding accessing datasets and viewing data visualizations. In some implementations, the application 110 comprises a web application, which can run in a web browser, and could be hosted at least partially on the server-side of environment 100. In addition, or instead, the application 110 can comprise a dedicated application. In some cases, the application 110 is integrated into the operating system (e.g., as a service). It is therefore contemplated herein that "application" be interpreted broadly.

At a high level, RL-based visualization recommendation manager 108 performs various functionality to facilitate efficient and effective using RL to recommend data visualizations. The RL-based visualization recommendation manager 108 can communicate with application 110 in order for application 110 to determine and generate recommended data visualizations based on an input dataset. In this regard, RL-based visualization recommendation manager 108 can receive input and/or selections regarding the data and/or recommended data visualizations from application 110 of the user device.

In operation, a dataset, a computational budget, and a data visualization recommendation model is accessed by RL-based visualization recommendation manager 108. For example, a user inputs a dataset via application 110 of user device 102 in order to generate recommendation data visualizations for the dataset. The user inputs a computational budget, such as an amount of time for processing the generating of the recommended data visualizations, via application 110 of user device 102. The user inputs a data visualization recommendation model, such as by inputting a request to generate data visualization recommendations and/ or selecting a data visualization recommendation model from a plurality of different data visualization recommendation models, via application 110 of user device 102. Any known data visualization recommendation model (e.g., such as any known data visualization recommendation technique) can be accessed by RL-based visualization recommendation manager 108.

RL-based visualization recommendation manager 108 is trained to determine a set of recommended features of the dataset based on a computational budget by sequentially exploring a series of samples of the dataset. In order to determine the set of recommended features of the dataset, a sample of the dataset is determined by RL-based visualization recommendation manager 108, such as by randomly sampling the dataset. In some embodiments, the size of the sample is determined by RL-based visualization recommendation manager 108 based on the size of the dataset.

The sample of the dataset is applied to a data visualization recommendation model of RL-based visualization recommendation manager 108 to determine features of the sample (e.g., by applying the statistical functions of the data visualization recommendation model to the sample, accessing metadata to determine descriptive features of the sample, etc.) and a score for each of the features of the sample. The features of the sample and the size of the dataset are used by RL-based visualization recommendation manager 108 to determine a computational cost estimation for determining each of the features of the sample when the features of the sample are applied to the dataset.

RL-based visualization recommendation manager 108 uses the computational budget and the sample of the dataset to determine a subset of the features of the sample that can be computed within the computational budget based on the corresponding computational cost of each of the subset of features. For example, RL-based visualization recommendation manager 108 starts with zero cost features and keeps exploring features to add to the subset of feature until the computational budget is met. At each exploration step, RL-based visualization recommendation manager 108 determines whether to explore (e.g., randomly) a new feature to add to the subset of features or exploit knowledge of a previously selected feature (e.g., the current knowledge of the RL agent based on the sequential series of samples) based on a reward function. The reward function is based on a change (e.g., an absolute value of the change) in the combined score of the subset of features before and after adding the new feature to the subset of features with respect to the computational cost of the new feature.

A loss function is computed by RL-based visualization recommendation manager 108 based on a difference between a combined score for each of the features of the sample and a combined score of each of the subset of features of the sample. A series of samples of the dataset are sequentially explored in a similar manner by RL-based visualization recommendation manager 108 in order to minimize the loss function resulting in determining a recommended set of features. The process of sequentially exploring a series of samples is terminated by RL-based visualization recommendation manager 108 when the loss function is below a threshold value resulting in determining a recommended set of features.

The data visualization recommendation model of RL-based visualization recommendation manager 108 determines the recommended data visualizations based on the recommended set of features determined by RL-based visualization recommendation manager 108. The data visualization recommendation model of RL-based visualization recommendation manager 108 generates the recommended data visualizations by populating the recommended data visualization with corresponding data from the dataset. The recommended data visualization (e.g., data visualization recommendation 106 with data visualization recommendations 106A-N) are then displayed to the user via application 110 of user device 102.

RL-based visualization recommendation manager 108 can be or include a server, including one or more processors, and one or more computer-readable media. The computer-readable media includes computer-readable instructions executable by the one or more processors. The instructions can optionally implement one or more components of RL-based visualization recommendation manager 108, described in additional detail below with respect to RL-based data visualization recommendation manager 202 of FIG. 2.

For cloud-based implementations, the instructions on RL-based visualization recommendation manager 108 can implement one or more components, and application 110 can be utilized by a user to interface with the functionality implemented on RL-based visualization recommendation manager 108. In some cases, application 110 comprises a web browser. In other cases, RL-based visualization recommendation manager 108 may not be required. For example, the components of RL-based visualization recommendation manager 108 may be implemented completely on a user device, such as user device 102. In this case, RL-based visualization recommendation manager 108 may be embodied at least partially by the instructions corresponding to application 110.

Thus, it should be appreciated that RL-based visualization recommendation manager 108 may be provided via multiple devices arranged in a distributed environment that collectively provide the functionality described herein. Additionally, other components not shown may also be included within the distributed environment. In addition, or instead, RL-based visualization recommendation manager 108 can be integrated, at least partially, into a user device, such as user device 102. Furthermore, RL-based visualization recommendation manager 108 may at least partially be embodied as a cloud computing service.

Figure 2:
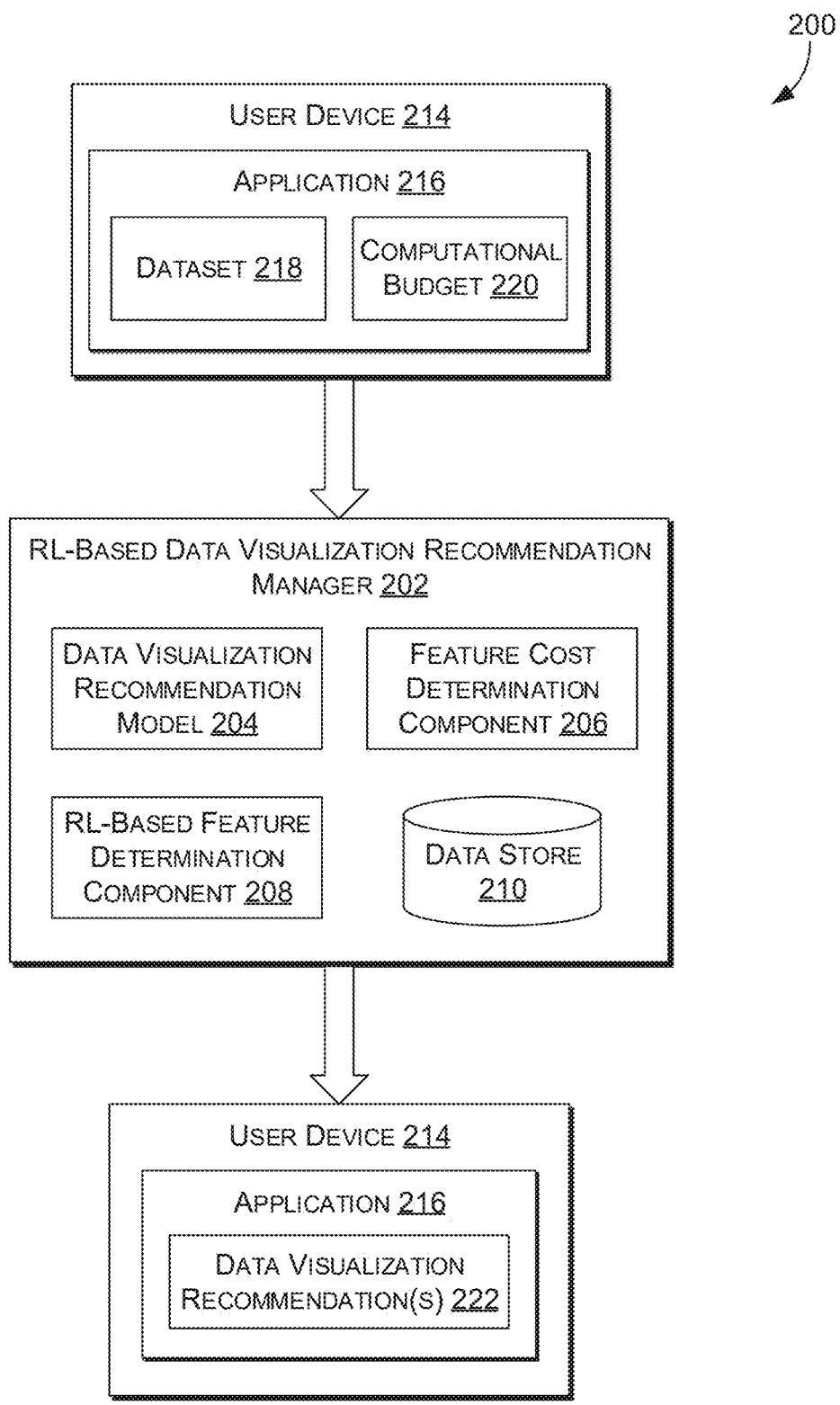
FIG. 2 depicts an example configuration of an operating environment in which some implementations of the present disclosure can be employed, in accordance with various embodiments of the present disclosure.

Referring to FIG. 2, aspects of an illustrative RL-based data visualization recommendation management system 200 are shown, in accordance with various embodiments of the present disclosure. At a high level, RL-based data visualization recommendation management system 200 can facilitate using RL to recommend data visualizations to determine the optimal features of a dataset for recommended data visualizations of a data visualization recommendation model for a given computational budget.

As shown in FIG. 2, RL-based data visualization recommendation manager 202 includes data visualization recommendation model 204, statistical feature cost determination component 206, and RL-based feature determination component 208. As an example, a user inputs a dataset 218 and a computational budget 220 through application 216 (e.g., application 110 of FIG. 1) on user device 214 (e.g., user device 102 of FIG. 1). Dataset 218 and computational budget 220, data visualization recommendation model 204, and/or other components can be input into and/or accessed by RL-based data visualization recommendation manager 202 through any known means (e.g., where computational budget 220 is already predetermined). The RL-based data visualization recommendation manager 202 facilitates using RL to generate and display data visualization recommendation(s) 222 through application 216 on user device 214. The RL-based data visualization recommendation manager 202 can communicate with the data store 210. The data store 210 is configured to store various types of information accessible by RL-based data visualization recommendation manager 202, or other server or component. The foregoing components of RL-based data visualization recommendation manager 202 can be implemented, for example, in operating environment 100 of FIG. 1. In particular, those components may be integrated into any suitable combination of user devices 102 and/or RL-based visualization recommendation manager 108.

In embodiments, data sources, user devices (such as user device 102 of FIG. 1), and RL-based data visualization recommendation manager 202 can provide data to the data store 210 for storage, which may be retrieved or referenced by any such component. As such, the data store 210 can store computer instructions (e.g., software program instructions, routines, or services), data and/or models used in embodiments described herein, such as datasets, data visualizations, data visualization recommendation models, regression models, RL frameworks, and/or the like. In some implementations, data store 210 can store information or data received or generated via the various components of RL-based data visualization recommendation manager 202 and provides the various components with access to that information or data, as needed. The information in data store 210 may be distributed in any suitable manner across one or more data stores for storage (which may be hosted externally).

The data visualization recommendation model 204 is generally configured to determine recommended data visualizations based on an input dataset. In embodiments, data visualization recommendation model 204 can include rules, conditions, associations, models, algorithms, or the like to determine recommended data visualizations. For example, data visualization recommendation model 204 may comprise a statistical model, fuzzy logic, neural network, finite state machine, support vector machine, logistic regression, clustering, or machine-learning techniques, similar statistical classification processes, or combinations of these to determine recommended data visualizations.

The feature cost determination component 206 is generally configured to determine the computational cost of a feature (e.g., a statistical feature) based on the size of a dataset. In embodiments, feature cost determination component 206 can include rules, conditions, associations, models, algorithms, or the like to determine the computational cost of a feature. For example, feature cost determination component 206 may comprise a statistical model, fuzzy logic, neural network, finite state machine, support vector machine, logistic regression, clustering, or machine-learning techniques, similar statistical classification processes, or combinations of these to determine the computation cost of a feature.

The RL-based feature determination component 208 is generally configured to determine a set of recommended features of the dataset based on a computational budget by sequentially exploring a series of samples of the dataset. In embodiments, RL-based feature determination component 208 can include rules, conditions, associations, models, algorithms, or the like to determine a set of recommended features of the dataset based on a computational budget by sequentially exploring a series of samples of the dataset. For example, RL-based feature determination component 208 may comprise a statistical model, fuzzy logic, neural network, finite state machine, support vector machine, logistic regression, clustering, or machine-learning techniques, similar statistical classification processes, or combinations of these to determine a set of recommended features of the dataset based on a computational budget by sequentially exploring a series of samples of the dataset.

In embodiments, a dataset, a computational budget, and a data visualization recommendation model is accessed by RL-based data visualization recommendation manager 202. For example, a user inputs a dataset 218 in order to generate recommendation data visualizations for the dataset. The user inputs a computational budget 220, such as an amount of time for processing the generating of the recommended data visualizations. The user inputs a data visualization recommendation model 204, such as by inputting a request to generate data visualization recommendations and/or selecting a data visualization recommendation model from a plurality of different data visualization recommendation models. Any known data visualization recommendation model 204 (e.g., such as any known data visualization recommendation technique) can be accessed by RL-based data visualization recommendation manager 202.

RL-based data visualization recommendation manager 202 is trained to determine a set of recommended features of the dataset based on a computational budget by sequentially exploring a series of samples of the dataset. In order to determine the set of recommended features of the dataset, a sample of the dataset (e.g., a small sample size, such as 1%) is determined by RL-based feature determination component 208, such as by randomly sampling the dataset. In some embodiments, the size of the sample is determined by RL-based feature determination component 208 based on the size of the dataset. For example, for a dataset with a billion rows, the size of the sample may be 0.001% whereas for a dataset with a million rows, the sample size may be 0.1%.

The sample of the dataset is applied to data visualization recommendation model 204 to determine features of the sample (e.g., by applying the statistical functions of the data visualization recommendation model to the sample, accessing metadata to determine descriptive features of the sample, etc.) and a score for each of the features of the sample. For example, the scores for each of the features of the sample corresponds to the scores of the data visualization configurations determined based on each of the features that are used to determine the recommended data visualizations by the data visualization recommendation model 204. As can be understood, the computational cost to compute features for a sample of the dataset is exponentially less than computing features of the entire dataset (e.g., based on the sample size with respect to the size of the dataset).

The features (e.g., the statistical features) of the sample and the size of the dataset are applied to feature cost determination component 206 (e.g., utilizing a regression model) to determine a computational cost estimation for determining each of the features (e.g., the statistical features) of the sample when the features of the sample are applied to the dataset. In this regard, feature cost determination component 206 is trained to determine the computational cost estimation (e.g., the time to compute a feature) for a feature (e.g., a statistical feature) based on the size of the dataset and the computational capabilities of the system implementing RL-based feature determination component 208. For example, feature cost determination component 206 profiles the computational cost estimation (e.g., time) of each feature across varying dataset sizes by utilizing data points to estimate the computational cost estimation for each feature for larger datasets (e.g., extrapolate to larger datasets) without requiring the actual computation of the feature.

The computational budget and the sample of the dataset are applied to RL-based feature determination component 208 and RL-based feature determination component 208 determines a subset of the features of the sample that can be computed within the computational budget based on the corresponding computational cost of each of the subset of features. For example, RL-based feature determination component 208 starts with zero cost features (e.g., features, such as descriptive features, length of the data, title, which columns are numeric, etc., that take minimal computational cost to compute, such as below a threshold amount of time) and keeps exploring features to add to the subset of feature until RL-based feature determination component 208 the computational budget is met. At each exploration step of RL-based feature determination component 208, RL-based feature determination component 208 determines whether to explore (e.g., randomly) a new feature to add to the subset of features or exploit knowledge of a previously selected feature (e.g., the current knowledge of the RL agent based on the sequential series of samples) based on a reward function. The reward function is based on a change (e.g., an absolute value of the change) in the combined score of the subset of features (e.g., as determined by the data visualization recommendation model 204) before and after adding the new feature to the subset of features with respect to the computational cost of the new feature (e.g., as determined by feature cost determination component 206).

A loss function is computed by RL-based feature determination component 208 based on a difference between a combined score for each of the features of the sample determined by data visualization recommendation model 204 and a combined score of each of the subset of features of the sample determined by RL-based feature determination component 208. A series of samples of the dataset are sequentially explored in a similar manner (e.g., by data visualization recommendation model 204, feature cost determination component 206, and RL-based feature determination component 208) in order to minimize the loss function resulting determining a recommended set of features. For example, a subsequent sample is applied to the data visualization recommendation model 204 to determine features of the subsequent sample and a score for each of the features of the subsequent sample. In some embodiments, the size of each subsequent sample of the series of samples is greater than the previous sample. For example, an initial sample of the dataset is a 0.1% random sampling of the dataset and a subsequent sample is a 0.5% random sampling of the dataset. The features of the subsequent sample and the dataset are applied to feature cost determination component 206 to determine a computational cost estimation for determining each of the features of the subsequent sample when the features of the sample are applied to the dataset. The computational budget and the subsequent sample of the dataset are applied to RL-based feature determination component 208 to determine a subset of the features of the subsequent sample that can be computed within the computational budget based on the corresponding computational cost of each of the subset of features of the subsequent sample. The loss function is computed by RL-based feature determination component 208 based on a difference between a combined score for each of the features of the sample determined by the data visualization recommendation model 204 and a combined score of each of the subset of features of the subsequent sample determined by RL-based feature determination component 208.

The process of sequentially exploring a series of samples is terminated by RL-based feature determination component 208 when the loss function is below a threshold value resulting in determining a recommended set of features.

Although terminating sequentially exploring the series of samples when the loss function is below a threshold value is provided as an example herein, terminating sequentially exploring the series of samples may be determined or applied in any known way. In this regard, RL-based feature determination component 208 is trained to determine a recommended set of features for the dataset by sequentially exploring a series of samples of the dataset. The data visualization recommendation model 204 determines the recommended data visualizations based on the recommended set of features (e.g., as determined by RL-based feature determination component 208). The data visualization recommendation model 204 generates the recommended data visualizations by populating the recommended data visualization (e.g., data visualization recommendation(s) 222) with corresponding data from the dataset. The recommended data visualization (e.g., data visualization recommendation(s) 222) are then displayed to the user via application 216 on user device 214.

Figure 3:
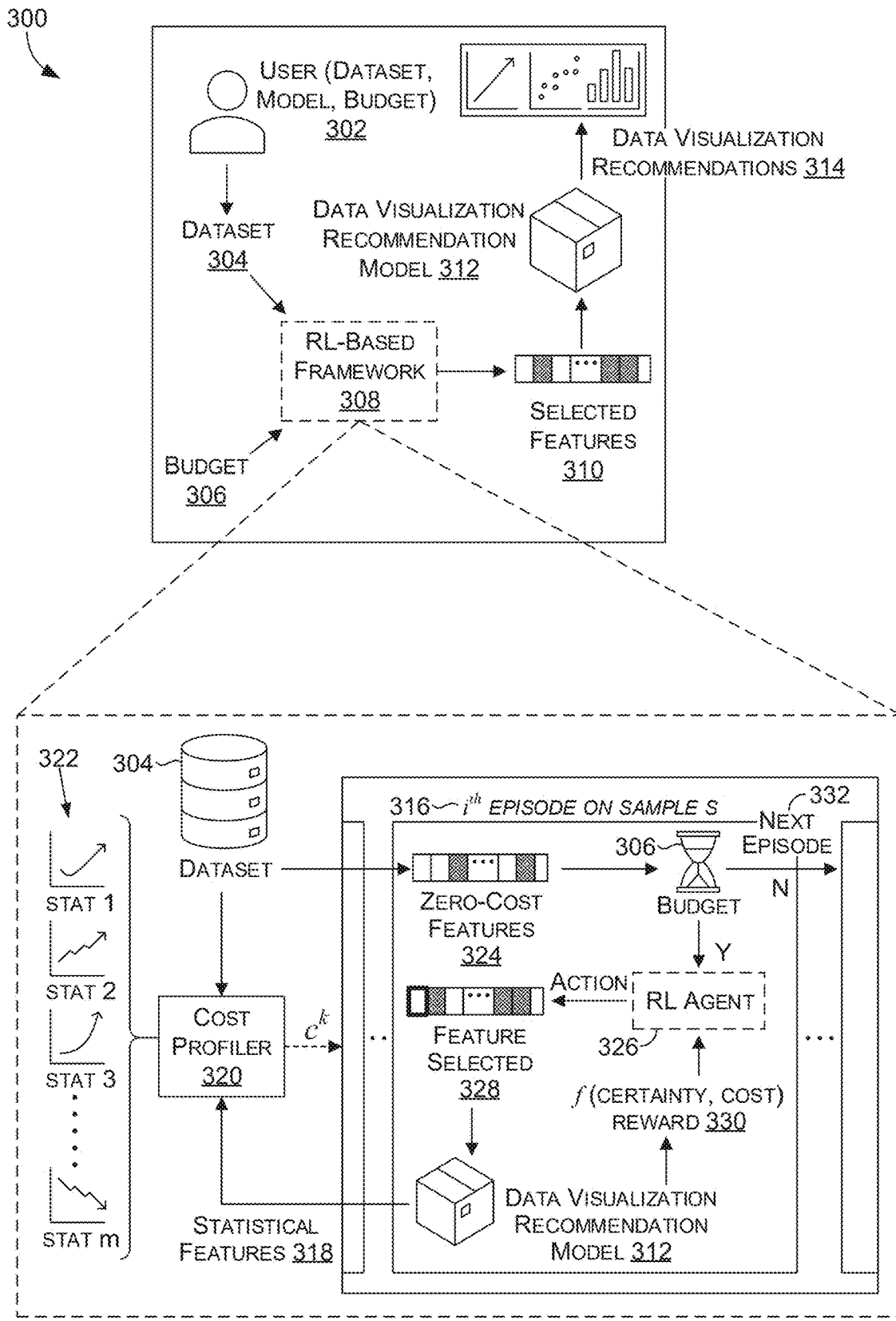
FIG. 3 provides an example diagram of using RL to recommend data visualizations, in accordance with embodiments of the present disclosure.

FIG. 3 provides an example diagram 300 of using RL to recommend data visualizations, in accordance with embodiments of the present disclosure. At a high level, as shown in FIG. 3, with respect to an inference pipeline, a user 302 inputs a dataset 304 and a budget 306 into RL-based framework 308. The RL-based framework determines the selected features 310. The selected features 310 and the dataset 304 are input into data visualization recommendation model 312 that generates visualization recommendations 314.

With respect to a training pipeline, the RL-based framework 308 is trained to determine a set of recommended features (e.g., selected features 310) of the dataset 304 based on the computational budget 306 by sequentially exploring a series of samples of the dataset. As further shown in FIG. 3, for sample 316 of dataset 304, data visualization recommendation model 312 determines the statistical features 318 of the sample 316. Cost profiler 320 determines computational cost for each of the statistical feature 318 based on the type of statistical feature for various statistical features 320 and the size of dataset 304. Continuing with sample 316, the zero cost features 324 of dataset 304 and budget 306 are input into RL agent 326. RL agent 326 determines the feature selected 328. Based on a function 330 of certainty with respect to computational cost of the feature selected 328 and reward for selecting a new feature (e.g., based on a score determined by the data visualization recommendation model 312), the RL agent 326 explores and exploits features until the budget 306 is exhausted for sample 316. The process is repeated in a subsequent episode 332. The process of sequentially exploring a series of samples is terminated when the loss function is below a threshold value resulting in determining a recommended set of features.

In some embodiments, P is a target data visualization recommendation model that a user wants to apply on a large tabular dataset D. D includes m columns and r rows. F is the feature space for dataset D based on statistical features used in the model P. As data visualization recommendation models calculate a large number of different statistics from each column, the number of statistical features computed from each column is n. $f_{ij}$ is the j-th feature for i-th column, where $i \in \{1, \ldots, m\}$ and $j \in \{1, \ldots, n\}$.

The cost function is $c^k: F \leftarrow R^{m \times n}$, quantifying the computational time required to calculate each of the features based on a k fraction from D (e.g., such fraction will consist of 1/k rows of D). $c^1$ serves as the cost function for the entire dataset D, and for brevity, $c^1$ is denoted as c.

In some embodiments, the statistical feature selection can be framed as an optimization task. $\theta: F \rightarrow \{0,1\}^{m \times n}$ is a function mapping features to binary acquisition decisions. $\theta(f) \odot f$ gives a subset of features by ignoring the masked features, where $f \in F$ and $\odot$ is the Hadamard operator which calculates the product of two matrices of the same dimension. L is a loss function which compares the output of the model on two different input feature set. In this regard, the objective is to find the feature mask minimizing the error in the model's prediction while ensuring the total cost of selected features adheres to the budget B:

$$\min_{\theta} \mathcal{L}|P\theta(f) \odot f - P(f)|, \text{ subject to: } \sum_{i,j} \theta(f) \odot c(f) \leq B \quad (1)$$

Here, the budget B is constrained by the total computational cost of features calculated on the complete dataset:

$$\mathcal{B} \leq \sum_{i,j} c(f) \quad (2)$$

B, time-to-compute visualization recommendations, is the constraint, because it is intuitive for users to specify a time-budget. In some embodiments, the constraint is relative to the size of D. For example, $B \leq r \times \Sigma_{i,j} c(f)$ where r is a particular user-specified fraction of the statistical feature computation time for the base data visualization recommendation model.

Turning back to FIG. 3, the cost profiler 320 estimates the computations cost of computing statistical features 318. RL agent training begins with a set of zero cost features 324. Within each episode (e.g., sample 316, sample 332, etc.), the RL agent 326 dynamically acquires features (e.g., 328) until the budget 306 is exhausted. The Q-value (e.g., 330) is estimated using rewards which is based on increased certainty in recommendations with newly acquired features, considering acquisition costs. The iterative process (e.g., as shown in FIG. 3) continues until error converges below a certain error value. Once trained, in the inference pipeline, the RL agent 326 of RL-based framework 308 now selects features (e.g., 310) for the specified budget 306, tailored to the dataset 304 and data visualization recommendation model 312.

In this regard, the problem can be approached as a scenario where decisions are made sequentially over time and the problem is modeled as a reinforcement learning problem. The overall pipeline, as shown in diagram 300 of FIG. 3, includes a cost profiler 320 (e.g., feature cost determination component 206 of FIG. 2), which employs polynomial regression to estimate the computational cost of computing statistic features across varying dataset sizes. This estimation can be used to predict costs without actually computing the statistical features. Subsequently, the RL agent 326 training teaches the agent to acquire features under budget constraints across increasing data samples. Once trained, the inference pipeline (e.g., RL-based framework 308 outputting selected features 310) utilizes the RL agent 326 to select features for the given budget, computing only the learned subset of features on the entire dataset to obtain model predictions.

The cost profiler 320 profiles the computation time (e.g., computational cost) of each statistical feature across varying dataset sizes. The cost profiler 320 collects data points to estimate the computational cost for each feature on larger datasets without actual computation.

For example, given the dataset D, the cost function $c^k$ is obtained for $|k|$ fractions of the dataset, denoted as $\{c^{k_1}, c^{k_2}, \ldots, c^{|k|}\}$. For each feature $f_{ij}$, the goal is to predict its cost $c_{ij}$ on the full dataset. Some features, such as column types, number of categories in a column, max-min value in a column, exhibit zero-cost, implying their cost remains constant with growing record sizes, e.g., $c_{ij}=0$. For other features, assuming polynomial growth of feature costs with dataset size.

An example algorithm for facilitating using RL to recommend data visualizations is provided as follows:

| Algorithm 1 RL algorithm to identify important features |
|---|

Given a dataset $\mathcal{D}$, budget $\mathcal{B}$ and a model $\mathcal{P}$
1  function SCALEVIZ($\mathcal{B}, \mathcal{D}, \mathcal{P}$):
2      $S \leftarrow [S_1, S_2, S_3, \ldots, S_{|s|}](|S_{k+1}| > |S_k| \forall k \in [1, |S|-1])$
3      for sample $S_k$ in the samples set S do
4          $x^{k,t} \leftarrow [f_{11}^{k,t}, f_{12}^{k,t}, \ldots, f_{1n}^{k,t}, f_{21}^{k,t}, \ldots, f_{2n}^{k,t}, \ldots, f_{m1}^{k,t}, \ldots, f_{mn}^{k,t}]$
5          $\widetilde{\mathcal{Y}}_k \leftarrow$ score predicted by $\mathcal{P}$ on all features, terminate_flag $\leftarrow$ False
6          while not terminate_flag do
7              if random in $[0,1) \leq Pr_{rand}$ then
8                  ij $\leftarrow$ index of a randomly selected unknown feature
9              else
10                 ij $\leftarrow$ Q($x^{k,t}$)(index of the feature with the maximum Q value)
11             end if
12             $x^{k,t+1} \leftarrow$ acquire $f_{ij}$ and unmask it
13             $P(x^{k,t}) \leftarrow$ score predicted using the feature set $x^{k,t}$
14             Total_cost $\leftarrow$ total_cost + $c_{ij}$
15             
$$r_{ij}^{k,t} \leftarrow \frac{\|\mathcal{P}(x^{k,t}) - \mathcal{P}(x^{k,t+1})\|}{c_{ij}}$$

16             push ($x^{k,t}$, ij, $x^{k,t+1}$, $r_{ij}^{k,t}$) into the replay memory
17             t $\leftarrow$ t + 1
18             if total_cost $\leq$ B then
19                 terminate_flag $\leftarrow$ True
20             $\widehat{\mathcal{Y}}_k \leftarrow \mathcal{P}(x^{k,t})$ predicted score on subset of features $x^{k,t}$
21             end if

| Algorithm 1 RL algorithm to identify important features |
|---|
| 22          loss ← $\mathcal{L}(\tilde{\mathcal{Y}}_k, \hat{\mathcal{Y}}_k)$
23          if update_condition then
24              train_batch ← random mini-batch from the replay memory
25              update (Q, target Q) networks using train batch
26          end if
27       end while
28       if ϵ < loss then terminate loop
29       end if
30    end for
31 end function |

In this regard, an RL agent based framework (e.g., RL-based data visualization recommendation manager 108 of FIG. 1, RL-based data visualization recommendation manager 108 of FIG. 2, etc.) can be used to learn feature acquisition under budget constraints. For example, each episode includes the agent choosing the important subset of features for a sample $S_k$. The state of the agent for an episode k is the feature set acquired by it so far in an episode (e.g., $x^{k,t} = \theta^{k,t}(f) \odot f$), where $\theta^{k,t}$ is the mask of the features at time t. The action $a_{k,t}$ of the agent is to select a feature which has not been masked in the feature set (e.g., $x^{k,t}$).

At every step t, the agent selects a feature ij and masks that feature as selected. The agent moves to the next state, which is $x^k = \theta^k(f) \odot f$. A cost of $c_{ij}$ is deducted from the remaining budget for choosing the feature. The reward for an action $a_{k,t}$ is calculated as the absolute change in the score before and after acquiring the feature, ij with a penalty of c.

$$r_t = \frac{\|P(x^{k,t}) - P(x^{k,t+1})\|}{c_{ij}} \quad (3)$$

In some embodiments, the technique of double deep Q-learning with experience replay buffer is used to train the RL agent. In some embodiments, the agent explores the feature space with a E-greedy approach, with the probability of exploration decaying exponentially. In some embodiments, the architecture of the Q-networks is a feed-forward neural network with three layers of sizes.

In the example algorithm, the example algorithm describes a training procedure for the RL agent, designed for cost-effective feature acquisition. The process initiates with the agent receiving a dataset D, a pre-defined budget B and a data visualization recommendation model P. The dataset is sequentially explored through a series of samples. The algorithm initializes by setting an initial exploration probability $Pr_{rand}$ and a termination threshold ϵ. In each episode, the agent learns the important subset of features for a particular sample $S_k$. Every episode starts with the same budget, B and the size of the samples keeps increasing with the number of episodes. The RL agent starts with a zero-cost feature set and keeps acquiring features until the RL agent runs out of budget. At every step of an episode, the agent chooses to explore randomly or exploit the current knowledge by selecting the feature with the maximum Q-value. The tuple (state, action, next state, reward) is pushed into the experience replay buffer. The Q and the target-Q networks are periodically updated using the tuples from the buffer. The process is terminated when the loss for an episode falls below the threshold E. The increasing size of the samples across episodes helps the agent to exploit the learned behavior of the model on a larger sample. In this regard, the agent can predict the important features on the full dataset which it has not been trained on. The RL agent ultimately selects the important and highly sensitive statistical features for the target base data visualization recommendation model P from a given dataset D.

Figure 4:
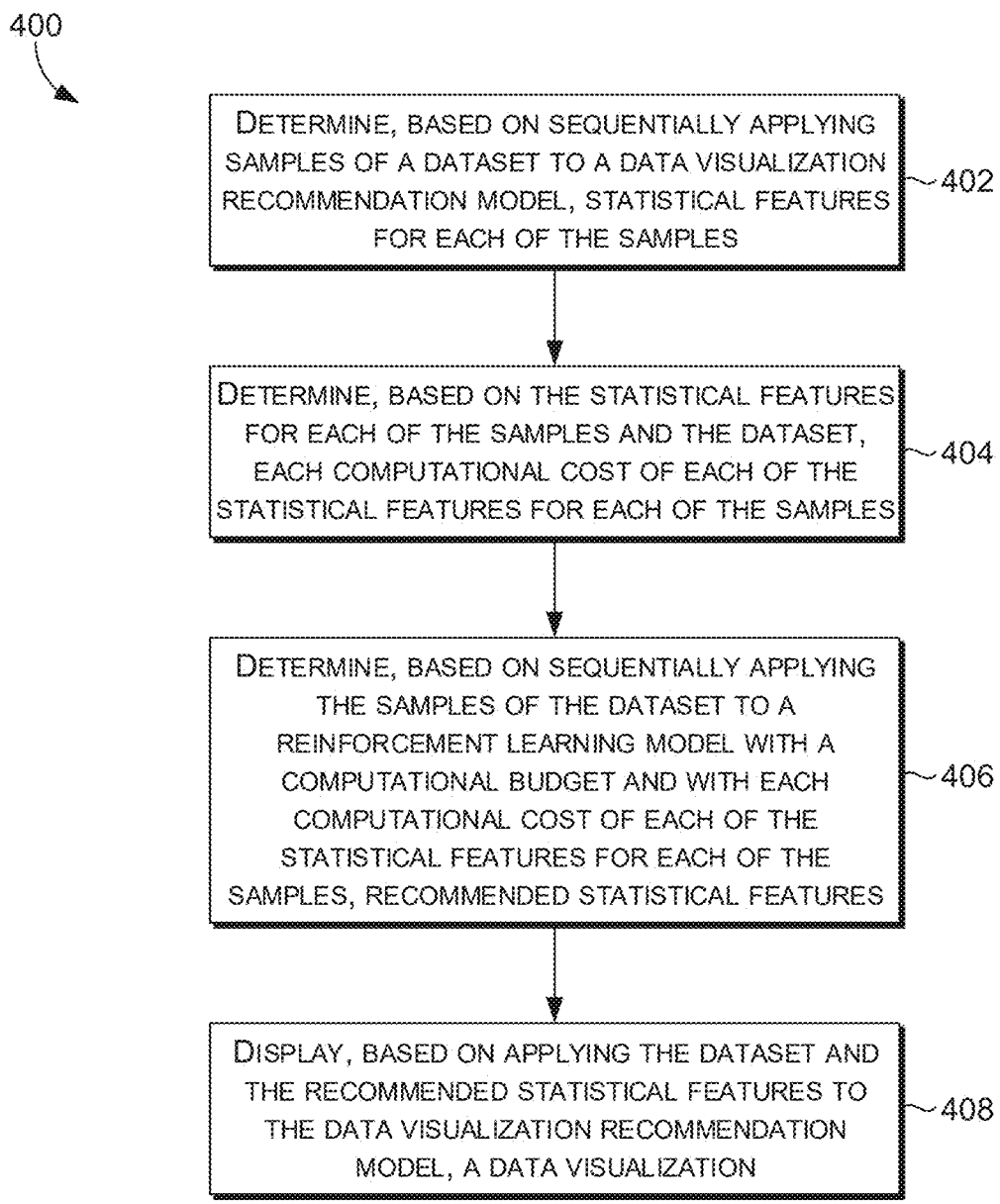
FIG. 4 is a process flow showing a method for using RL to recommend data visualizations, in accordance with embodiments of the present disclosure.
Figure 5:
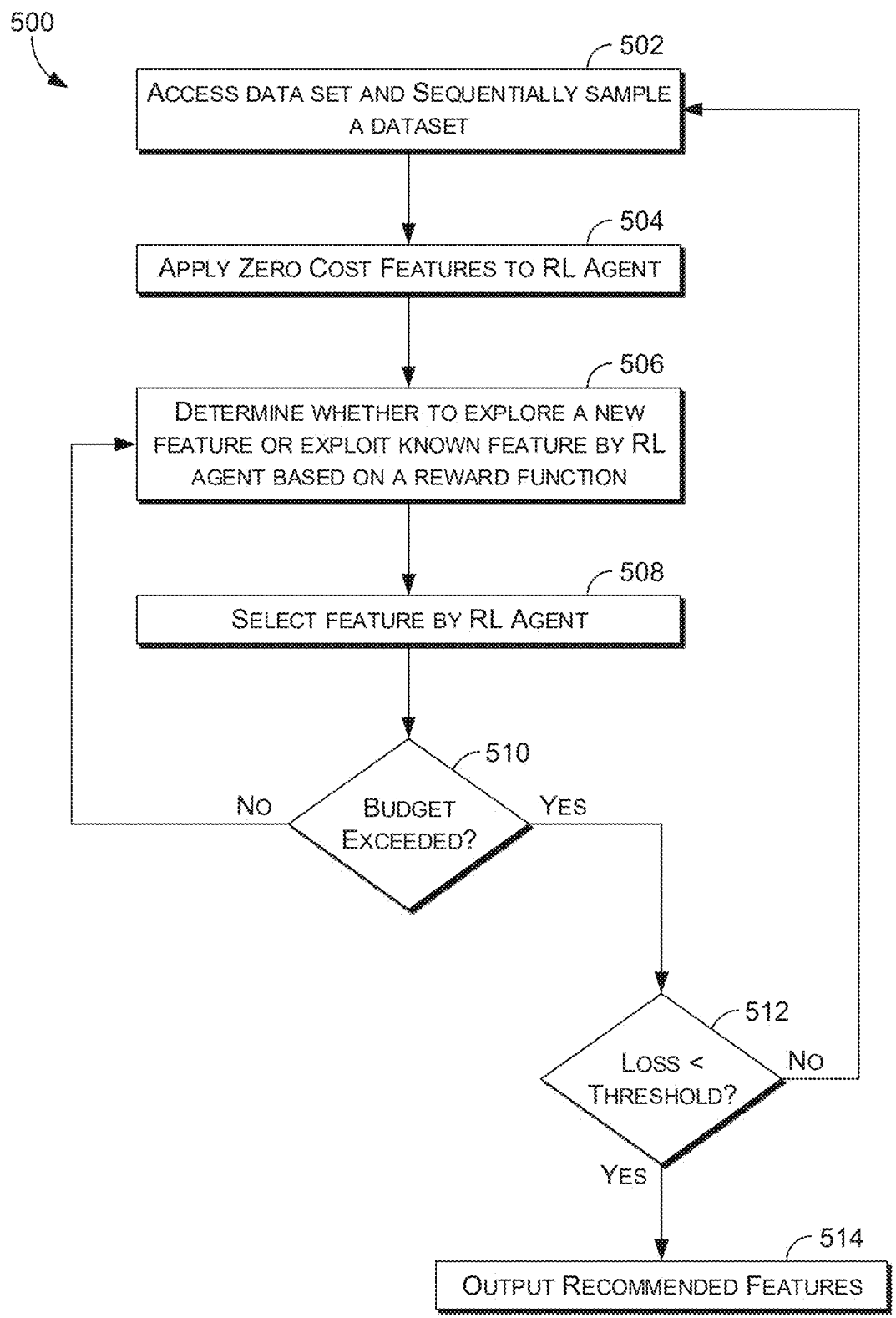
FIG. 5 is a process flow showing a method for using RL to recommend data visualizations by sequentially exploring a series of samples, in accordance with embodiments of the present disclosure.

With reference now to FIGS. 4-5, FIGS. 4-5 provide method flows related to facilitating using RL to recommend data visualizations, in accordance with embodiments of the present technology. Each block of method 400 and 500 comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method flows of FIGS. 4-5 are exemplary only and not intended to be limiting. As can be appreciated, in some embodiments, method flows 400-500 can be implemented, at least in part, to facilitate using RL to recommend data visualizations.

Turning now to FIG. 4, a flow diagram 400 is provided showing an embodiment of a method 400 for using RL to recommend data visualizations, in accordance with embodiments described herein. Initially, at block 402, statistical features for each of the samples are sequentially determined based on sequentially applying samples of a dataset to a data visualization recommendation model, statistical features for each of the samples. For example, a dataset, a computational budget, and a data visualization recommendation model is accessed by an RL framework. For example, a user inputs a dataset in order to generate recommendation data visualizations for the dataset. The user inputs a computational budget, such as an amount of time for processing the generating of the recommended data visualizations. The user inputs a data visualization recommendation model, such as by inputting a request to generate data visualization recommendations and/or selecting a data visualization recommendation model from a plurality of different data visualization recommendation models. Any known data visualization recommendation model (e.g., such as any known data visualization recommendation technique) can be accessed by the RL framework. The RL framework is trained to determine a set of recommended features of the dataset based on a computational budget by sequentially exploring a series of samples of the dataset. In order to determine the set of recommended features of the dataset, a sample of the dataset is determined, such as by randomly sampling the dataset. In some embodiments, the size of the sample is determined based on the size of the dataset. The sample of the dataset is applied to a data visualization recommendation model to determine features of the sample and a score for each of the features of the sample. For example, the scores for each of the features of the sample corresponds to the scores of the data visualization configurations determined based on each of the features that are used to determine the recommended data visualizations by the data visualization recommendation model.

At block 404, each computational cost of each of the statistical features for each of the samples is determined based on the statistical features for each of the samples and the dataset. For example, the features (e.g., the statistical features) of the sample and the size of the dataset are applied to a regression model to determine a computational cost estimation for determining each of the features (e.g., the statistical features) of the sample when the features of the sample are applied to the dataset. In this regard, a regression model is trained to determine the computational cost estimation for a feature (e.g., a statistical feature) based on the size of the dataset and the computational capabilities of the system implementing the RL framework. For example, the regression model profiles the computational cost estimation (e.g., time) of each feature across varying dataset sizes by utilizing data points to estimate the computational cost estimation for each feature for larger datasets (e.g., extrapolate to larger datasets) without requiring the actual computation of the feature.

At block 406, recommended statistical features are determined based on sequentially applying the samples of the dataset to a reinforcement learning model with a computational budget and with each computational cost of each of the statistical features for each of the samples. For example, the computational budget and the sample of the dataset are applied to an RL agent of the RL framework and the RL agent determines a subset of the features of the sample that can be computed within the computational budget based on the corresponding computational cost of each of the subset of features. For example, the RL agent starts with zero cost features (e.g., features, such as descriptive features, length of the data, title, which columns are numeric, etc., that take minimal computational cost to compute, such as below a threshold amount of time) and keeps exploring features to add to the subset of feature until the RL agent exceeds the budget. At each exploration step of the RL agent, the RL agent determines whether to explore (e.g., randomly) a new feature to add to the subset of features or exploit knowledge of a previously selected feature (e.g., the current knowledge of the RL agent based on the sequential series of samples) based on a reward function. The reward function is based on a change (e.g., an absolute value of the change) in the combined score of the subset of features (e.g., as determined by the data visualization recommendation model) before and after adding the new feature to the subset of features with respect to the computational cost of the new feature (e.g., as determined by the regression model).

In some embodiments, a loss function is computed based on a difference between a combined score for each of the features of the sample determined by the data visualization recommendation model and a combined score of each of the subset of features of the sample determined by the RL agent. A series of samples of the dataset are sequentially explored in a similar manner in order to minimize the loss function resulting in the RL framework determining a recommended set of features. The process of sequentially exploring a series of samples is terminated when the loss function is below a threshold value resulting in the RL framework determining a recommended set of features. Although terminating sequentially exploring the series of samples when the loss function is below a threshold value is provided as an example herein, terminating sequentially exploring the series of samples may be determined or applied in any known way.

At block 408, a data visualization is displayed based on applying the dataset and the recommended statistical features to the data visualization recommendation model. For example, the data visualization recommendation model determines the recommended data visualizations based on the recommended set of features (e.g., as determined by the RL framework). The data visualization recommendation model generates the recommended data visualizations by populating the recommended data visualization with corresponding data from the dataset. The recommended data visualizations are then displayed to the user.

Turning now to FIG. 5, a flow diagram 500 is provided showing an embodiment of a method 500 for using RL to recommend data visualizations by sequentially exploring a series of samples, in accordance with embodiments described herein. Initially, at block 502, a data set is accessed in order to determine recommended features for generated recommended data visualization based on the data set. The data set is then sequentially sampled. For example, the computational budget and the sample of the dataset are applied to an RL agent of the RL framework and the RL agent determines a subset of the features of the sample that can be computed within the computational budget based on the corresponding computational cost of each of the subset of features.

At block 504, the zero cost features are applied to the RL agent. For example, the RL agent starts with zero cost features (e.g., features, such as descriptive features, length of the data, title, which columns are numeric, etc., that take minimal computational cost to compute, such as below a threshold amount of time) and keeps exploring features to add to the subset of feature until the RL agent exceeds the budget.

At block 506, the RL agent determines whether to explore a new feature or exploit a known feature based on a reward function. For example, at each exploration step of the RL agent, the RL agent determines whether to explore (e.g., randomly) a new feature to add to the subset of features or exploit knowledge of a previously selected feature (e.g., the current knowledge of the RL agent based on the sequential series of samples) based on a reward function. The reward function is based on a change (e.g., an absolute value of the change) in the combined score of the subset of features (e.g., as determined by the data visualization recommendation model) before and after adding the new feature to the subset of features with respect to the computational cost of the new feature (e.g., as determined by the regression model).

At block 508, the RL agent selects a feature (e.g., a new feature or a known feature). At block 510, if the budget is not met by the computational cost of the new feature, the process returns to block 506 where the RL agent determines whether to explore a new feature or exploit a known feature based on a reward function.

If the budget is met by the computational cost of the new feature at block 510, it is determined whether the loss function is within a threshold value at block 512. For example, a loss function is computed based on a difference between a combined score for each of the features of the sample determined by the data visualization recommendation model and a combined score of each of the subset of features of the sample determined by the RL agent.

If the loss function is not within a threshold value, the process returns to block 502 where a new sample of the dataset is taken. For example, a series of samples of the dataset are sequentially explored in a similar manner in order to minimize the loss function resulting in the RL framework determining a recommended set of features.

If the loss function is within a threshold value at block 512, the recommended features are output by the RL agent at block 514. For example, the process of sequentially exploring a series of samples is terminated when the loss function is below a threshold value resulting in the RL framework determining a recommended set of features. In this regard, the RL agent of the RL framework is trained to determine a recommended set of features for the dataset by sequentially exploring a series of samples of the dataset. The data visualization recommendation model determines the recommended data visualizations based on the recommended set of features (e.g., as determined by the RL framework). The data visualization recommendation model generates the recommended data visualizations by populating the recommended data visualization with corresponding data from the dataset. The recommended data visualization are then displayed to the user.

Having briefly described an overview of aspects of the technology described herein, an exemplary operating environment in which aspects of the technology described herein may be implemented is described below in order to provide a general context for various aspects of the technology described herein.

Figure 6:
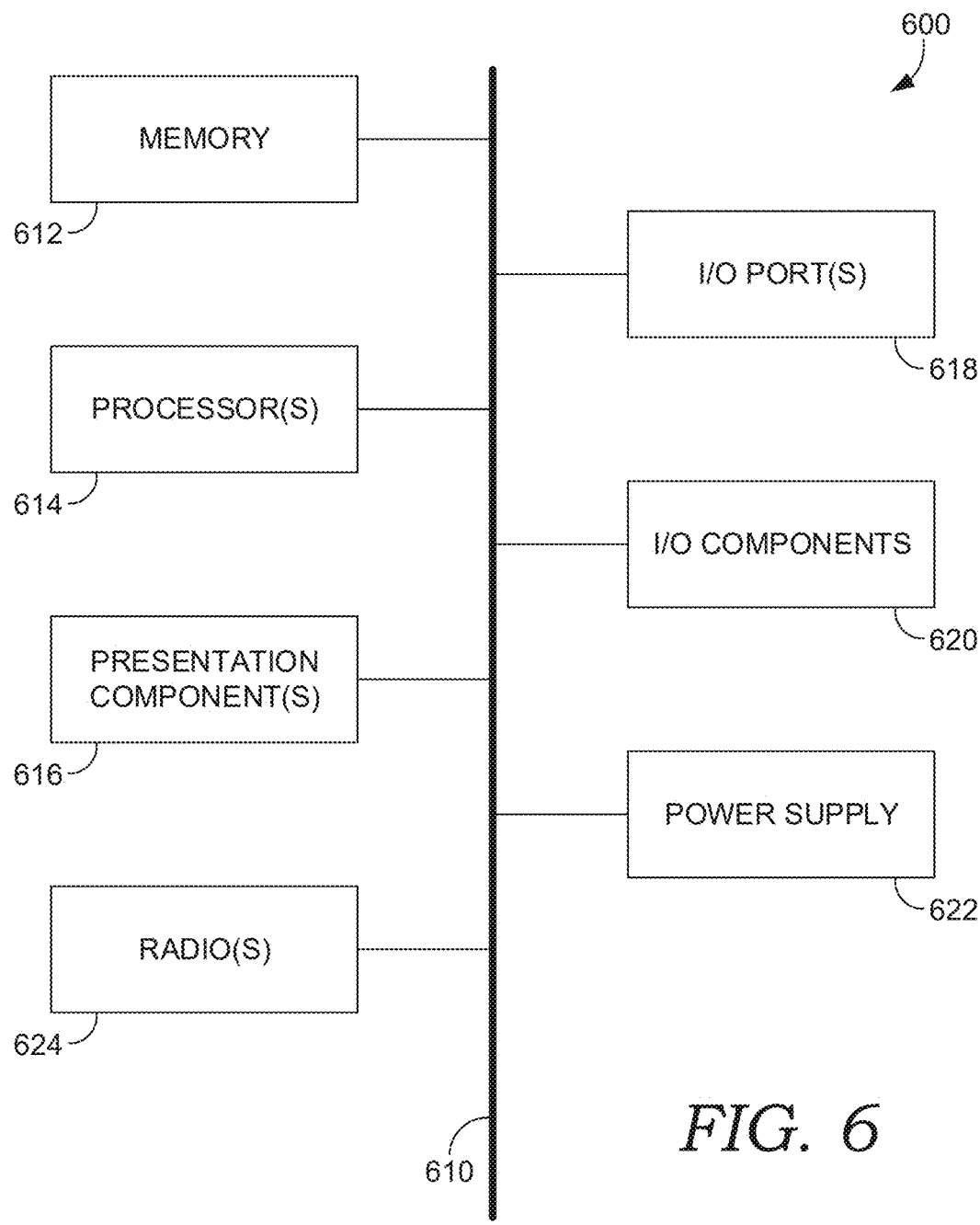
FIG. 6 is a block diagram of an example computing device in which embodiments of the present disclosure can be employed.

Referring to the drawings in general, and initially to FIG. 6 in particular, an exemplary operating environment for implementing aspects of the technology described herein is shown and designated generally as computing device 600. Computing device 600 is just one example of a suitable computing environment and is not intended to suggest any limitation as to the scope of use or functionality of the technology described herein. Neither should the computing device 600 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 6, computing device 600 includes a bus 610 that directly or indirectly couples the following devices: memory 612, one or more processors 614, one or more presentation components 616, input/output (I/O) ports 618, I/O components 620, an illustrative power supply 622, and a radio(s) 624. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 6 is merely illustrative of an exemplary computing device that can be used in connection with one or more aspects of the technology described herein. Distinction is not made between such categories as "workstation," "server," "laptop," and "handheld device," as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 612 includes computer storage media in the form of volatile and/or nonvolatile memory. The memory 612 may be removable, non-removable, or a combination thereof. Exemplary memory includes solid-state memory, hard drives, and optical-disc drives. Computing device 600 includes one or more processors 614 that read data from various entities such as bus 610, memory 612, or I/O components 620. Presentation component(s) 616 present data indications to a user or other device. Exemplary presentation components 616 include a display device, speaker, printing component, and vibrating component. I/O port(s) 618 allow computing device 600 to be logically coupled to other devices including I/O components 620, some of which may be built in.

Illustrative I/O components include a microphone, joystick, game pad, satellite dish, scanner, printer, display device, wireless device, a controller (such as a keyboard, and a mouse), a natural UI (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 614 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 600. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

A computing device may include radio(s) 624. The radio 624 transmits and receives radio communications. The computing device may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

What is claimed is:

1. One or more non-transitory computer-readable media having a plurality of executable instructions embodied thereon, which, when executed by one or more processors, cause the one or more processors to perform a method comprising:
   determining, based on applying a sample of a dataset to a data visualization recommendation model, statistical features of the sample for generating data visualizations of the sample;
   determining, based on applying the statistical features and the dataset to a regression model, corresponding computational costs of the statistical features when applying the statistical features to the dataset;
   determining, based on applying a computational budget, the sample of the dataset and the corresponding computational costs to a reinforcement learning model, recommended statistical features by causing the reinforcement learning model to:
      select corresponding statistical features from the statistical features of the sample to add to the recommended statistical features until the computational budget is met by determining, based on a reward function, whether to explore a statistical feature from the statistical features of the sample or exploit a previously explored statistical feature from the statistical features of the sample; and
      minimize a loss function between the recommended statistical features and the statistical features of the sample until the loss function is within a threshold value; and
   causing display, based on applying the dataset and the recommended statistical features to the data visualization recommendation model, of a recommended data visualization.

2. The one or more non-transitory computer-readable media of claim 1, the method further comprising:
   training the regression model to compute the corresponding computational costs of the statistical features for different dataset sizes, wherein the corresponding computational costs of the statistical features of the sample correspond to a size of the dataset.

3. The one or more non-transitory computer-readable media of claim 1, the method further comprising:
   sequentially applying different samples of the dataset to the reinforcement learning model to minimize the loss function based on a combined score of the recommended statistical features.

4. The one or more non-transitory computer-readable media of claim 1, the method further comprising:
   minimizing the loss function between a combined score of the recommended statistical features and a corresponding combined score of the statistical features of the sample within the threshold value.

5. The one or more non-transitory computer-readable media of claim 1, the method further comprising:
   determining the reward function based on a change in a score of the recommended statistical features when adding a corresponding statistical feature to the recommended statistical features with respect to a corresponding computational cost of the statistical feature.

6. The one or more non-transitory computer-readable media of claim 1, wherein determining the statistical features of the sample further comprises applying statistical functions of the data visualization recommendation model to the sample of the dataset.

7. The one or more non-transitory computer-readable media of claim 1, wherein the computational budget is an amount of time and the corresponding computational costs of the statistical features correspond to an estimated amount of time to compute a corresponding statistical feature of the statistical features based on a size of the dataset.

8. A computer-implemented method comprising:
determining, based on applying samples of a dataset to a data visualization recommendation model, statistical features of each sample of the samples for generating data visualizations of each sample;
determining, based on applying the statistical features of each sample to a regression model, corresponding computational costs of the statistical features of each sample when applying the statistical features of each sample to the dataset;
determining, based on sequentially applying each sample to a reinforcement learning model with a computational budget and with the corresponding computational costs of the statistical features of each sample, recommended statistical features by causing the reinforcement learning model to:
for each sample, select corresponding statistical features from the statistical features of the sample to add to corresponding recommended statistical features for the sample until the computational budget is met by determining, based on a reward function, whether to explore a statistical feature from the statistical features of each of the samples or exploit a previously explored statistical feature from the statistical features of each of the samples;
for each sample, minimize a loss function between the corresponding recommended statistical features for the sample and the statistical features of the sample; and
sequentially apply each sample to the reinforcement learning model until the loss function is within a threshold value to determine the recommended statistical features; and
causing display of a data visualization based on applying the dataset and the recommended statistical features to the data visualization recommendation model.

9. The computer-implemented method of claim 8, further comprising:
training the regression model to compute the corresponding computational costs of the statistical features for different dataset sizes, wherein the corresponding computational costs of the statistical features of each sample correspond to a size of the dataset.

10. The computer-implemented method of claim 8, further comprising:
minimizing the loss function based on a combined score of the corresponding recommended statistical features.

11. The computer-implemented method of claim 8, further comprising:
minimizing the loss function between a corresponding combined score of the corresponding recommended statistical features and a combined score of the statistical features within the threshold value.

12. The computer-implemented method of claim 8, further comprising:
determining the reward function based on a change in a score of the recommended statistical features when adding a corresponding statistical feature to the corresponding recommended statistical features for the sample with respect to a corresponding computational cost of the statistical feature.

13. The computer-implemented method of claim 8, wherein each of the samples is randomly sampled and each sample size of each of the samples increases in size when sequentially applying each sample to the reinforcement learning model.

14. The computer-implemented method of claim 8, wherein determining the statistical features of each sample further comprises applying statistical functions of the data visualization recommendation model to each sample.

15. A computing system comprising:
a processor; and
a non-transitory computer-readable medium having stored thereon instructions that when executed by the processor, cause the processor to perform operations including:
determining, based on applying samples of a dataset to a data visualization recommendation model, statistical features of each sample of the samples for generating data visualizations of each sample;
causing a regression model to determine, based on the statistical features of each sample, corresponding computational costs of the statistical features of each sample when applying the statistical features of each sample to the dataset;
causing a reinforcement learning model to determine, based on sequentially applying each sample to the reinforcement learning model with a computational budget and with the corresponding computational costs of the statistical features of each sample, recommended statistical features by causing the reinforcement learning model to:
for each sample, select corresponding statistical features from the statistical features of the sample to add to corresponding recommended statistical features for the sample until the computational budget is met by determining, based on a reward function, whether to explore a statistical feature from the statistical features of each of the samples or exploit a previously explored statistical feature from the statistical features of each of the samples; and
for each sample, minimize a loss function between the corresponding recommended statistical features for the sample and the statistical features of the sample; and
sequentially apply each sample to the reinforcement learning model until the loss function is within a threshold value to determine the recommended statistical features; and
causing display, based on applying the dataset and the recommended statistical features to the data visualization recommendation model, of a data visualization.

16. The computing system of claim 15, the operations further including:
training the regression model to compute the corresponding computational costs of the statistical features for different dataset sizes, wherein the corresponding computational costs of the statistical features of each sample correspond to a size of the dataset.

17. The computing system of claim 15, the operations further including:
minimizing the loss function based on a combined score of the corresponding recommended statistical features.

18. The computing system of claim 15, the operations further including:
minimizing the loss function between a corresponding combined score of the corresponding recommended statistical features and a combined score of the statistical features within the threshold value.

19. The computing system of claim 15, the operations further including:
  determining the reward function based on a change in a score of the recommended statistical features when adding a corresponding statistical feature to the corresponding recommended statistical features for the sample with respect to a corresponding computational cost of the statistical feature.

20. The computing system of claim 15, wherein each of the samples is randomly sampled and each sample size of each of the samples increases in size when sequentially applying each sample to the reinforcement learning model.

* * * * *